United States Patent
Takeda et al.

(10) Patent No.: US 11,782,200 B2
(45) Date of Patent: Oct. 10, 2023

(54) POLARIZING PLATE HAVING SPECIFIED WATER CONTACT ANGLE OF ANTIREFLECTION LAYER SURFACE

(71) Applicant: DEXERIALS CORPORATION, Tokyo (JP)

(72) Inventors: Tomu Takeda, Tome (JP); Hiroyuki Takahashi, Tokyo (JP)

(73) Assignee: DEXERIALS CORPORATION, Tochigi (JP)

( * ) Notice: Subject to any disclaimer, the term of this patent is extended or adjusted under 35 U.S.C. 154(b) by 96 days.

(21) Appl. No.: 17/248,242

(22) Filed: Jan. 15, 2021

(65) Prior Publication Data
US 2021/0223451 A1 Jul. 22, 2021

(30) Foreign Application Priority Data
Jan. 21, 2020 (JP) .................. 2020-007241

(51) Int. Cl.
  *G02B 1/11* (2015.01)
  *G02B 1/115* (2015.01)
  (Continued)

(52) U.S. Cl.
  CPC .............. *G02B 5/3058* (2013.01); *G02B 1/11* (2013.01); *G02B 1/115* (2013.01); *G02B 5/3008* (2013.01); *G02F 1/133548* (2021.01)

(58) Field of Classification Search
  CPC ...... G02B 1/11–118; G02B 5/285–288; G02B 5/3058; G02F 1/133548
  See application file for complete search history.

(56) References Cited

U.S. PATENT DOCUMENTS 8,192,639 B2 * 6/2012 Schulz .................. G02B 1/111
  216/67
9,165,971 B2 * 10/2015 Greer .................. H01L 27/1464
  (Continued)

FOREIGN PATENT DOCUMENTS

JP  2000162988  6/2000
JP  2005055899  3/2005
  (Continued)

OTHER PUBLICATIONS

"Japanese Application Serial No. 2020-007241, Office Action dated Jun. 6, 2023", w English Translation, (Jun. 6, 2023), 7 pgs.

*Primary Examiner* — Ryan S Dunning
(74) *Attorney, Agent, or Firm* — Schwegman Lundberg & Woessner, P.A.

(57) ABSTRACT

Provided is a transparent substrate, a plurality of protrusions protruding from the first surface of the transparent substrate; and an antireflection film laminated on the second surface opposite to the first surface of the transparent substrate, wherein the plurality of protrusions are periodically arranged at a pitch shorter than a wavelength of light in a use band, each of the protrusions extends in in a first direction and includes a reflective layer, a dielectric layer, and an absorption layer in order from the first direction, the antireflection film has high refractive index layers and low refractive index layers that are alternately laminated, and the antireflection film is an ion beam assisted vapor deposition film or an ion beam sputtering film.

6 Claims, 5 Drawing Sheets

(51) Int. Cl.
 *G02B 5/30* (2006.01)
 *G02F 1/1335* (2006.01)

(56) References Cited

U.S. PATENT DOCUMENTS

| | | | | |
|---|---|---|---|---|
| 2004/0244423 | A1* | 12/2004 | Boontarika | C03B 40/00 65/102 |
| 2008/0186576 | A1* | 8/2008 | Takada | G02B 5/3025 349/5 |
| 2011/0217532 | A1* | 9/2011 | Deguchi | B05D 5/06 428/409 |
| 2014/0139910 | A1* | 5/2014 | Gafsi | G02B 27/281 427/163.1 |
| 2018/0052257 | A1* | 2/2018 | Nielson | H04N 9/3167 |

FOREIGN PATENT DOCUMENTS

| | | |
|---|---|---|
| JP | 2005242080 A | 9/2005 |
| JP | 2008216956 | 9/2008 |
| JP | 2008216957 | 9/2008 |
| JP | 2008225210 | 9/2008 |
| JP | 2010060587 A | 3/2010 |
| JP | 2011039218 | 2/2011 |
| JP | 2015203856 | 11/2015 |
| JP | 2016038537 A | 3/2016 |
| JP | 2018106130 | 7/2018 |

\* cited by examiner

POLARIZING PLATE HAVING SPECIFIED WATER CONTACT ANGLE OF ANTIREFLECTION LAYER SURFACE

CLAIM FOR PRIORITY

This application claims the benefit of priority to Japanese Application Serial No. 2020-007241, filed Jan. 21, 2020, which is hereby incorporated by reference in its entirety.

TECHNICAL FIELD

The present invention relates to a polarizing plate, an optical apparatus and method of manufacturing a polarizing plate.

BACKGROUND ART

Polarizing plates are used in liquid crystal displays and the like. In recent years, attention has been focused to wire grid polarizing plates in which reflective layers are arranged at intervals which are shorter than a wavelength of light in a use band.

For example, Patent Literature 1 describes a polarizing plate having an antireflection layer and a wire grid in this order on a substrate.

Further, for example, Patent Literature 2 describes a wire grid polarizer in which an antireflection coating is applied on a substrate on a surface on which a wire grid is formed and a surface on the opposite side thereof.

Further, for example, Patent Literature 3 describes a polarizing element having an antireflection layer on a substrate on a surface opposite to the surface on which the wire grid is formed.

CITATION LIST

Patent Literatures

[Patent Literature 1]
Japanese Unexamined Patent Application, First Publication No. 2016-38537
[Patent Literature 2]
Japanese Unexamined Patent Application, First Publication No. 2005-242080
[Patent Literature 3]
Japanese Unexamined Patent Application, First Publication No. 2010-60587

SUMMARY OF INVENTION

Technical Problem

In recent years, high brightness and high definition of liquid crystal projectors and the like are required. There is a demand for a polarizing plate that is durable even in an environment of high luminous intensity and strong light and has high transmittance characteristics.

The antireflection layer of the polarizing plate described in Patent Literature 1 is composed of hollow particles, a solvent and a binder, and the organic substances remaining in the antireflection layer may be decomposed in a high temperature environment to deteriorate the characteristics. The antireflection layer of the polarizers described in Patent Literatures 2 and 3 is not described in detail and may not have sufficient durability.

The present invention has been made in view of the above problems, and an object of the present invention is to provide a polarizing plate and an optical apparatus having excellent reliability.

Solution to Problem

The present invention provides the following means for solving the above problems.

According to a first aspect of the present invention, there is provided a polarizing plate having a wire grid structure comprising a transparent substrate, a plurality of protrusions protruding from the first surface of the transparent substrate, and an antireflection film laminated on the second surface opposite to the first surface of the transparent substrate, wherein the plurality of protrusions are periodically arranged at a pitch shorter than a wavelength of light in a use band, each of the protrusions extends in in a first direction and includes a reflective layer, a dielectric layer, and an absorption layer in order from the first direction, the antireflection film has high refractive index layers and low refractive index layers that are alternately laminated, and the antireflection film is an ion beam assisted vapor deposition film or an ion beam sputtering film.

According to a second aspect of the present invention, there is provided a polarizing plate having a wire grid structure comprising a transparent substrate, a plurality of protrusions protruding from the first surface of the transparent substrate, and an antireflection film laminated on the second surface opposite to the first surface of the transparent substrate, wherein the plurality of protrusions are periodically arranged at a pitch shorter than a wavelength of light in a use band, each of the protrusions extends in in a first direction and includes a reflective layer, a dielectric layer, and an absorption layer in order from the first direction, the antireflection film has high refractive index layers and low refractive index layers that are alternately laminated, and the contrast reduction rate after 1000 hours at a temperature of 250° C. is less than 40%.

According to a third aspect of the present invention, there is provided a polarizing plate having a wire grid structure comprising a transparent substrate, a plurality of protrusions protruding from the first surface of the transparent substrate, and an antireflection film laminated on the second surface opposite to the first surface of the transparent substrate, wherein the plurality of protrusions are periodically arranged at a pitch shorter than a wavelength of light in a use band, each of the protrusions extends in in a first direction and includes a reflective layer, a dielectric layer, and an absorption layer in order from the first direction, the antireflection film has high refractive index layers and low refractive index layers that are alternately laminated, and the antireflection layer has a peeling load of 33 mN or more in a microscratch test with a scratch speed of 10 μm/sec according to JIS R3255.

According to a fourth aspect of the present invention, there is provided an optical apparatus comprising the polarizing plate according to the first aspect.

According to a fifth aspect of the present invention, there is provided an optical apparatus comprising the polarizing plate according to the second aspect.

According to a sixth aspect of the present invention, there is provided an optical apparatus comprising the polarizing plate according to the third aspect.

According to a seventh aspect of the present invention, there is provided a method of manufacturing a polarizing plate having a wire grid structure comprising a step of laminating alternately high-refractive index layers and low-refractive index layers on one surface of the transparent substrate by an ion beam assisted vapor deposition method or an ion beam sputtering method, and forming an antireflection layer on the transparent substrate, a step of laminating a reflective layer, a dielectric layer, and an absorbing layer in this order on the surface of the transparent substrate opposite to the surface on which the antireflection layer is formed to form a laminate, and a step of processing the laminate to form a plurality of protrusions that are periodically arranged at a pitch shorter than wavelength of light in use band.

Advantageous Effects of Invention

According to the polarizing plate and the optical device according to the above aspect, the reliability can be improved.

DESCRIPTION OF EMBODIMENTS

Hereinafter, the present embodiments will be described in detail with appropriate reference to the drawings. The drawings used in the following description may sometimes be drawn with specific portions enlarged to facilitate comprehension of the features of the present invention, and the dimensional ratios and the like between the constituent elements may differ from the actual values. The materials and dimensions and the like presented in the following description are merely examples, which in no way limit the present invention, and may be altered as appropriate within the scope of the present invention.

[Polarizing Plate]

Figure 1:
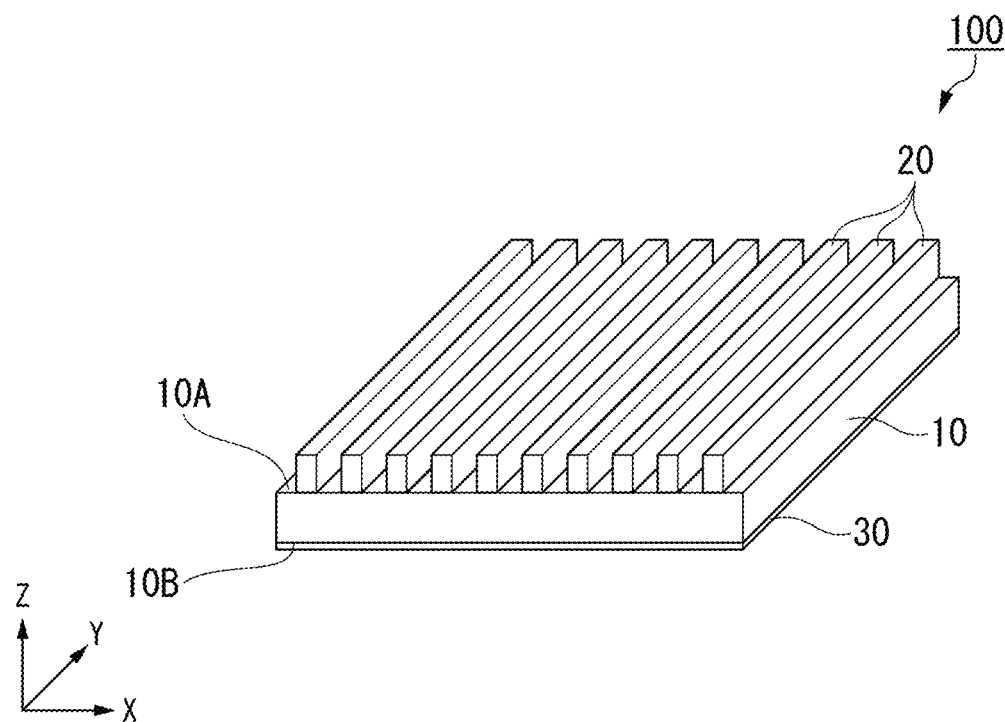
FIG. 1 is a perspective view of the polarizing plate according to a first embodiment.

FIG. 1 is a perspective view of the polarizing plate 100 according to the first embodiment. The polarizing plate 100 includes a transparent substrate 10, a plurality of protrusions 20 and an antireflection layer 30. The plurality of protrusions 20 project from the first surface 10A of the transparent substrate 10. The antireflection layer 30 is laminated on the second surface 10B of the transparent substrate 10. The second surface 10B is a surface of the transparent substrate 10 opposite to the first surface 10A.

Here we define the direction. The inside of the plane where the transparent substrate 10 spreads is the inside of the XY plane, and the direction in which the protrusions 40 extends is the Y direction. The direction orthogonal to the Y direction is defined as the X direction. The direction orthogonal to the X direction and the Y direction is defined as the Z direction. The Y direction is an example of the first direction.

The polarizing plate 100 attenuates a polarized wave (TE wave (S wave)) having an electric field component parallel to the Y direction in which the protrusions 20 extends, and transmits a polarized wave (TM wave (P wave)) having an electric field component perpendicular to the Y direction. The polarizing plate 100 has an absorption axis in the Y direction and a transmission axis in the X direction. The polarizing plate 100 attenuates TE waves by four actions of transmission, reflection, interference, and selective light absorption of polarized waves due to optical anisotropy, and transmits TM waves.

[Transparent Substrate]

The transparent substrate 10 has transparency for light having a wavelength in a use band of the polarizing plate 100. The expression "has transparency" does not necessarily mean that the substrate transmits 100% of the light of the wavelength in the use band, provided that sufficient light is transmitted to enable the functionality as a polarizing plate to be maintained. An average thickness of the transparent substrate 10 is preferably 0.3 mm or more and 1 mm or less.

A material having a refractive index of 1.1 or more and 2.2 or less is preferably used for the transparent substrate 10. The transparent substrate 10 is, for example, glass, quartz, sapphire, etc. can be used. A component composition of the glass material used as the transparent substrate 10 is not particularly limited.

For example, silicate glass is widely available as optical glass, and is inexpensive. Further, quartz glass (having a refractive index of 1.46) and soda lime glass (having a refractive index of 1.51) have a low cost and have excellent transparency. In contrast, quartz and sapphire are excellent in thermal conductivity. The material of the transparent substrate 10 can be appropriately selected depending on the performance required of the polarizing plate 100. For example, since a polarizing plate for an optical engine of a projector is irradiated with strong light, it is required to have light resistance and heat dissipation. For this reason, quartz and sapphire are preferably used for the transparent substrate 10 for projector use.

In the case in which the transparent substrate 10 is an optically active crystal such as quartz or sapphire, when the direction in which the protrusions 20, which will be described later, extends is parallel to or perpendicular to the optical axis of the crystal, the optical characteristics are improved. The optical axis is a directional axis that minimizes the difference in refractive index between ordinary light rays and abnormal light rays traveling in that direction.

[Protrusions]

The protrusions 20 protrude from the transparent substrate 10 in the z direction, and extend in the y direction. The protrusions 20 are periodically arranged in the x direction. A pitch P between the neighboring protrusions 20 in the x direction is shorter than the wavelength of the light in the use band of the polarizing plate 100. For example, the pitch P is preferably 100 nm or more and 200 nm or less. If the pitch P is within this range, the protrusions 20 are easily made, and mechanical stability and stability of optical properties of the protrusions 20 are improved.

The pitch P between the neighboring protrusions 20 can be measured as an average value by a scanning electron microscope or a transmission electron microscope. For example, a distance between the neighboring protrusions 20 in the x direction may be measured at four random locations, and the pitch P obtained as an arithmetic mean thereof. A measurement method for averaging the measured values at four random locations among the plurality of the protrusions 20 is referred to as an electron microscopy method.

The protrusions 20 protrude from the transparent substrate 10. A main direction in which the protrusions 20 protrude is, for example, the z direction. An average width of the protrusions 20 in the x direction is preferably 20% or more and 50% or less of the pitch P. Here, the average width of the protrusions 20 means an average value of the widths at each point obtained by dividing the protrusions 20 into 10 parts in the z direction. A height of each of the protrusions 20 is, for example, 250 nm or more and 400 nm or less. Further, an aspect ratio obtained by dividing the height of each of the protrusions 20 by the average width is, for example, 5 or more and 13.3 or less.

Figure 2:
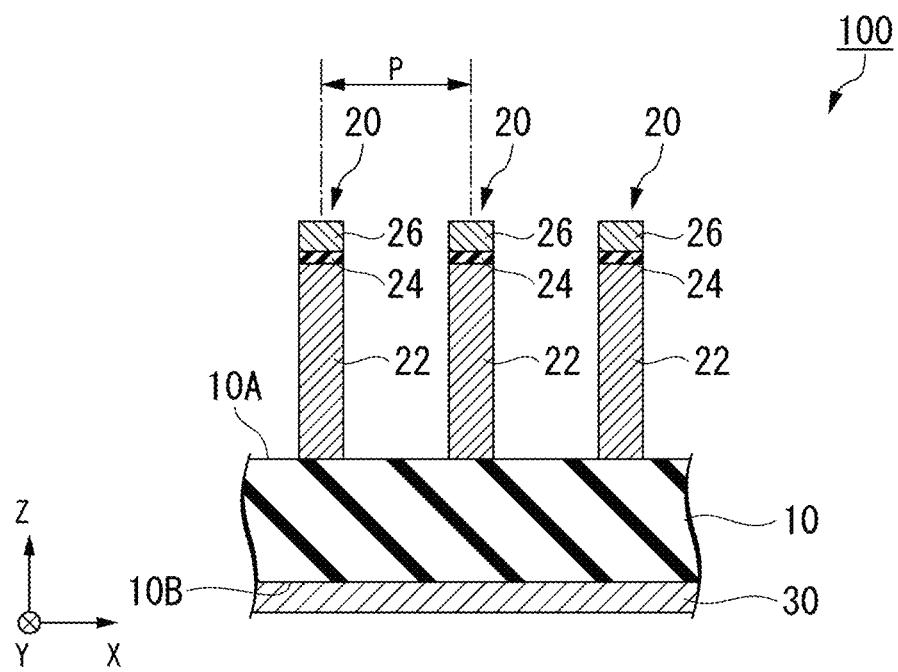
FIG. 2 is a cross-sectional view of the polarizing plate according to a first embodiment.

FIG. 2 is a cross-sectional view of the polarizing plate 100 according to the first embodiment. FIG. 2 is a cross-sectional view of the polarizing plate 100 cut along the XZ plane. The protrusions 20 include a reflective layer 22, a dielectric layer 24, and an absorbing layer 26 in this order from the first surface 10A.

When the light incident on the polarizing plate 100 from the first surface 10A side passes through the absorption layer 26 and the dielectric layer 24, a part of the light is absorbed and attenuated. Of the light transmitted through the absorption layer 26 and the dielectric layer 24, TM (P wave) is transmitted through the reflection layer 22. On the other hand, of the light transmitted through the absorption layer 26 and the dielectric layer 24, TE (S wave) is reflected by the reflection layer 22. When the reflected TE wave passes through the absorption layer 26 and the dielectric layer 24, a part of the reflected TE wave is absorbed, and a part of the reflected TE wave is reflected again and returns to the reflection layer 22. The TE wave reflected by the reflection layer 22 interferes with and is attenuated when passing through the absorption layer 26 and the dielectric layer 24. The polarizing plate 100 exhibits polarization characteristics due to the selective attenuation of TE waves as described above.

[Reflective Layer]

The reflective layer 22 is on the first surface 10A of the transparent substrate 10. Another layer may be inserted between transparent substrate 10 and the reflection layer 22. The reflective layer 22 protrudes from the transparent substrate 10 in the z direction, and extends in a strip shape in the y direction. The reflective layer 22 reflects a TE wave (an S wave) and transmits a TM wave (a P wave). The height of the reflective layer 22 is, for example, 100 nm or more and 300 nm or less.

The reflective layer 22 includes a material having reflectivity with respect to light having a wavelength in the use band. The reflective layer 22 includes, for example, an elemental metal such as Al, Ag, Cu, Mo, Cr, Ti, Ni, W, Fe, Si, Ge, Ta, or the like, or an alloy thereof. The reflective layer 22 is made of, for example, aluminum or an aluminum alloy. The reflective layer 22 is not limited to metal, and may be an inorganic film or a resin film whose surface reflectance is increased by coloring or the like.

The reflective layer 22 can be formed into a high-density film by, for example, a vapor deposition method or a sputtering method. The reflective layer 22 may be composed of two or more layers having different constituent materials.

[Dielectric Layer]

The dielectric layer 24 is laminated, for example, on the reflective layer 22. The dielectric layer 24 does not necessarily need to be in contact with the reflective layer 22, and another layer may be present between the dielectric layer 24 and the reflective layer 22. The dielectric layer 24 extends in a strip shape in the y direction.

A thickness of the dielectric layer 24 can be determined depending on a polarized wave reflected by the absorption layer 26. The thickness of the dielectric layer 24 is such that the phase of the polarized wave reflected by the absorbing layer 26 and the phase of the polarized wave reflected by the reflecting layer 22 are deviated by half a wavelength. The thickness of the dielectric layer 24 is, for example 1 nm or more and 500 nm or less. If the thickness of the dielectric layer 24 is within this range, a relationship between the phases of the two reflected polarized waves can be adjusted, and an interference effect can be enhanced. The thickness of the dielectric layer 24 can be measured using the aforementioned electron microscopy method.

The dielectric layer 24 includes, for example, a metal oxide, magnesium fluoride ($MgF_2$), cryolite, germanium, silicon, boron nitride, carbon, or combinations thereof. Metal oxides include, for example, a Si oxide such as $SiO_2$, $Al_2O_3$, a beryllium oxide, a bismuth oxide, a boron oxide, a tantalum oxide, and so on. The dielectric layer 24 is, for example, a Si oxide or a Ti oxide.

A refractive index of the dielectric layer 24 is, for example, greater than 1.0 and smaller than or equal to 2.5. The optical characteristics of the reflective layer 22 are also influenced by a surrounding refractive index (e.g., the refractive index of the dielectric layer 24). Therefore, the refractive index of the dielectric layer 24 is adjusted, and thereby polarization characteristics of the polarizing plate can be controlled.

The dielectric layer 24 can be formed by, for example, a vacuum deposition method, a sputtering method, a chemical vapor deposition (CVD) method, or an atomic layer deposition (ALD) method. The dielectric layer 24 may be composed of two or more layers.

[Absorption Layer]

The absorption layer 26 is, for example, laminated on the dielectric layer 24. The absorption layer 26 extends in a strip shape in the y direction. The film thickness of the absorption layer 26 is, for example, 5 nm or more and 50 nm or less. The film thickness of the absorption layer 26 can be measured by the aforementioned electron microscopy.

The absorption layer 26 has one or more materials having a light absorption function in which an extinction constant which is an optical constant is not zero. The absorption layer 26 includes a metal material or a semiconductor material. The material used for the absorption layer 26 can be appropriately selected according to a wavelength range of light in the use band of the polarizing plate.

In a case where the metal material is used for the absorption layer 26, the metal material is, for example, an elemental metal such as Ta, Al, Ag, Cu, Au, Mo, Cr, Ti, W, Ni, Fe, Sn, or the like, or an alloy containing one or more elements. Further, in a case where the semiconductor material is used for the absorption layer 26, the semiconductor material is, for example, Si, Ge, Te, ZnO, a silicide. The silicide is, for example, $\beta$-$FeSi_2$, $MgSi_2$, $NiSi_2$, $BaSi_2$, $CrSi_2$, $TaSi$, and so on. The polarizing plate 100 in which these materials are used for the absorption layer 26 has a high extinction ratio with respect to the visible light range. Further, the absorption layer 26 includes, for example, Fe or Ta, and Si.

In the case where the semiconductor material is used for the absorption layer 26, a band-gap energy of a semiconductor contributes to an absorption action of light. For this reason, the band-gap energy of the semiconductor material is less than or equal to the value obtained by converting the wavelength in the use band into energy. For example, in a case where the use band is the visible light range, a semiconductor material having a band-gap energy of 3.1 eV or less with respect to the absorption energy at a wavelength of 400 nm or more is preferably used for the absorption layer 26.

The absorption layer 26 is not limited to one layer and may be composed of two or more layers. In a case where the absorption layer 26 has two or more layers, materials of these layers may be different. The absorption layer 26 can be formed by a method such as vapor deposition, a sputtering method, or the like.

[Antireflection Layer]

Figure 3:
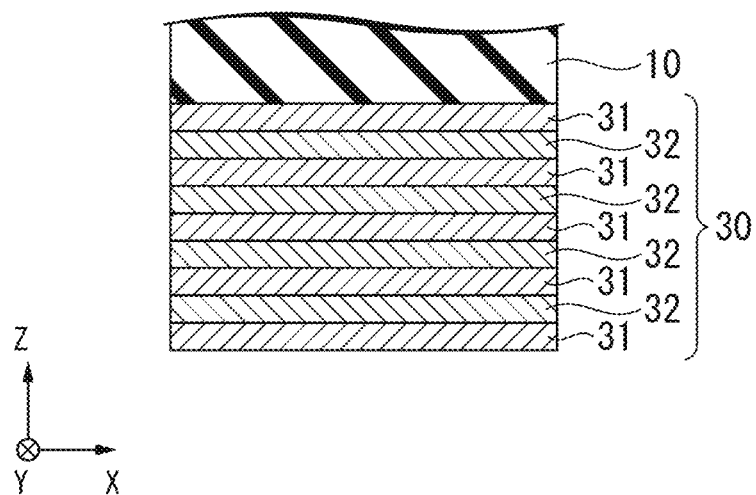
FIG. 3 is a cross-sectional view of the characteristic part of the polarizing plate according to a first embodiment.

The antireflection layer 30 is laminated on the second surface 10B opposite to the first surface 10A on which the protrusions 20 of the transparent substrate 10 is formed. FIG. 3 is a cross-sectional view of a characteristic portion of the polarizing plate 100 according to the first embodiment FIG. 3 is an enlarged cross-sectional view of the antireflection layer 30 of the polarizing plate 100.

The antireflection layer 30 uses the interference of light to prevent reflection. In the antireflection layer 30, low refractive index layers 31 and high refractive index layers 32 are alternately laminated. The low refractive index layer 31 has a lower refractive index than the adjacent layers. The high refractive index layer 32 has a higher refractive index than the adjacent layers. The refractive index layer 31 is, for example, larger than 1.0 and has a lower refractive index than the transparent substrate 10. The high refractive index layer 32 has a higher refractive index than, for example, the low refractive index layer 31. The film thicknesses of the low refractive index layer 31 and the high refractive index layer 32 are appropriately selected depending on the wavelength range of light in the use band and the like. The film thickness of each of the low refractive index layer 31 and the high refractive index layer 32 is, for example, 1 nm or more and 500 nm or less. The film thickness of each of the low refractive index layer 31 and the high refractive index layer 32 may be different.

The low refractive index layer 31 and the high refractive index layer 32 are dielectric layers. The low refractive index layer 31 and the high refractive index layer 32 includes, for example, oxides such as Si oxide, Ti oxide, Zr oxide, Al oxide, Nb oxide, Ta oxide, Bi oxide, Be oxide and the like, magnesium fluoride, cryolite, germanium, silicon, and carbon. For example, the low refractive index layer 31 is $SiO_2$, and the high refractive index layer 32 is $TiO_2$ or $NbO_2$.

The antireflection layer 30 is, for example, an ion beam assisted vapor deposition film or an ion beam sputtering film. The ion beam assisted vapor deposition film is a film formed by the ion beam assisted vapor deposition (IAD) method. The ion beam sputtering film is a film formed by an ion beam sputtering (IBS) method.

Figure 4A:
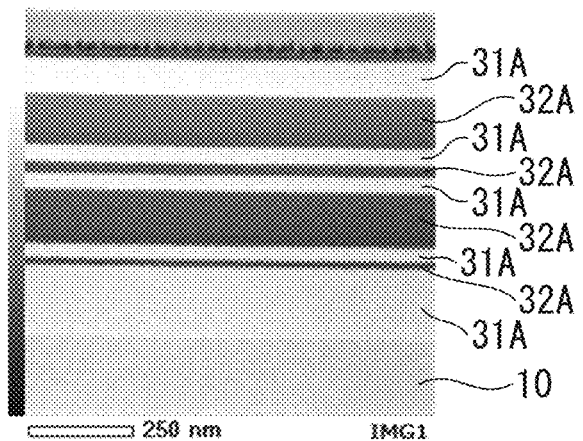
FIG. 4A is a cross-sectional photograph of the antireflection layer formed by an ion beam assisted vapor deposition method.
Figure 4B:
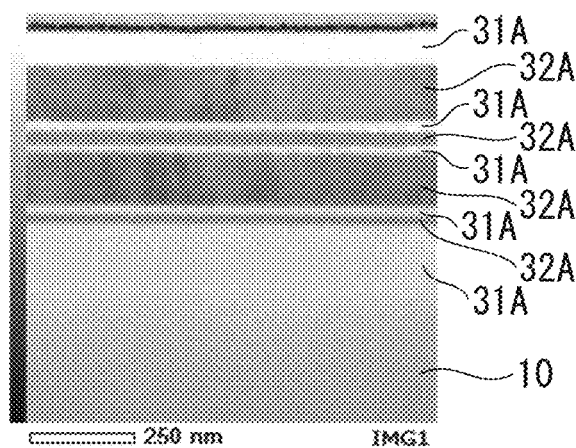
FIG. 4B is a cross-sectional photograph of the antireflection layer formed by a vacuum vapor deposition method.

FIGS. 4A and 4B are a cross-sectional photographs of the antireflection layer. FIG. 4A shows an antireflection layer 30 formed by an ion beam assisted vapor deposition method, and FIG. 4B shows an antireflection layer formed by a vacuum vapor deposition method. The dark part is the $TiO_2$ layer 32A, the white part is the $SiO_2$ layer 31A, and the gray part is the transparent substrate 10.

As shown in FIG. 4B, in the antireflection layer formed by the vacuum vapor deposition method, a plurality of white lines can be confirmed in the Z direction, and a grain boundary can also be confirmed. In addition, altered layers with different appearances were found in other parts of the layer. The altered layer is probably affected by moisture or heat during the manufacturing process. As a result of energy dispersive X-ray analysis, the oxygen distribution at the interface of each layer of the antireflection layer formed by the vacuum vapor deposition method was unclear. In addition, as a result of evaluation by electron energy loss spectroscopy (EELS), among the antireflection layers formed by the vacuum vapor deposition method, the $TiO_2$ layer 32A was composed of polycrystals containing $TiO_2$ having an anatase-type crystal structure.

On the other hand, the antireflection layer 30 formed by the ion beam assisted vapor deposition method is homogeneous, grain boundaries cannot be confirmed, and is dense. Further, the antireflection layer 30 formed by the ion beam assisted vapor deposition method has a higher interface smoothness than the antireflection layer formed by the vacuum vapor deposition method. In addition, as a result of evaluation by energy dispersive X-ray analysis, in the antireflection layer 30 formed by the ion beam assisted vapor deposition method, a difference in oxygen concentration was confirmed even at the interface of each layer, and the oxygen distribution was clear.

[Protective Film, Water-Repellent Film]

The polarizing plate 100 may have other components in addition to the transparent substrate 10, the protrusions 20, and the antireflection layer 30. For example, a protective film may be formed on an incident side of light of the polarizing plate 100. The protective layer enhances reliability such as heat resistance of the polarizing plate 100. Further, for example, a water-repellent film may be provided on the surface of the protrusions 20. The water-repellent film is made of, for example, a fluorine-based silane compound such as perfluorodecyltriethoxysilane (FDTS). The water-repellent film can be formed by, for example, a CVD method or an ALD method. The water-repellent film enhances reliability such as moisture resistance of the polarizing plate 100.

[Method of Manufacturing Polarizing Plate]

The method for manufacturing the polarizing plate 100 according to the present embodiment includes a step of forming antireflection layer 30, a step of forming a laminate (laminated body, layered body) which is the base of the protrusions, and a step of processing the laminate into the protrusions 20.

First, the low refractive index layer 31 and the high refractive index layer 32 are alternately laminated on the second surface 10B of the transparent substrate 10. The low refractive index layer 31 and the high refractive index layer 32 are formed by an ion beam assisted vapor deposition method or an ion beam sputtering method. The number of layers of the refractive index layer 31 and the high refractive index layer 32 can be appropriately changed. The film thicknesses of the low refractive index layer 31 and the high refractive index layer 32 are appropriately selected depending on the wavelength range of light in the use band and the like. The antireflection layer 30 is formed on the second surface 10B by alternately laminating the low refractive index layer 31 and the high refractive index layer 32.

Next, in the film forming step, a layer to be a reflective layer, a layer to be a dielectric layer, and a layer to be an absorption layer are laminated in this order on the first surface 10A of the transparent substrate 10 to form a laminate. These layers are formed, for example, by a sputtering method or a vapor deposition method.

Finally, the laminate is processed. For processing the laminate, for example, a photolithography method, a nanoimprint method, or the like is used. For example, a mask pattern is formed with a resist in a one-dimensional lattice pattern on one surface of the laminate. The protrusions 20 are formed by selectively etching the portion where the resist is not formed. Etching is performed by, for example, dry etching. Further, after forming the protrusions 20, a protective layer and a water-repellent layer may be formed on the protective layer.

The polarizing plate 100 according to the present embodiment is excellent in reliability. Reliability and the like are, for example, moisture resistance, heat resistance, and scratch resistance.

Figure 5:
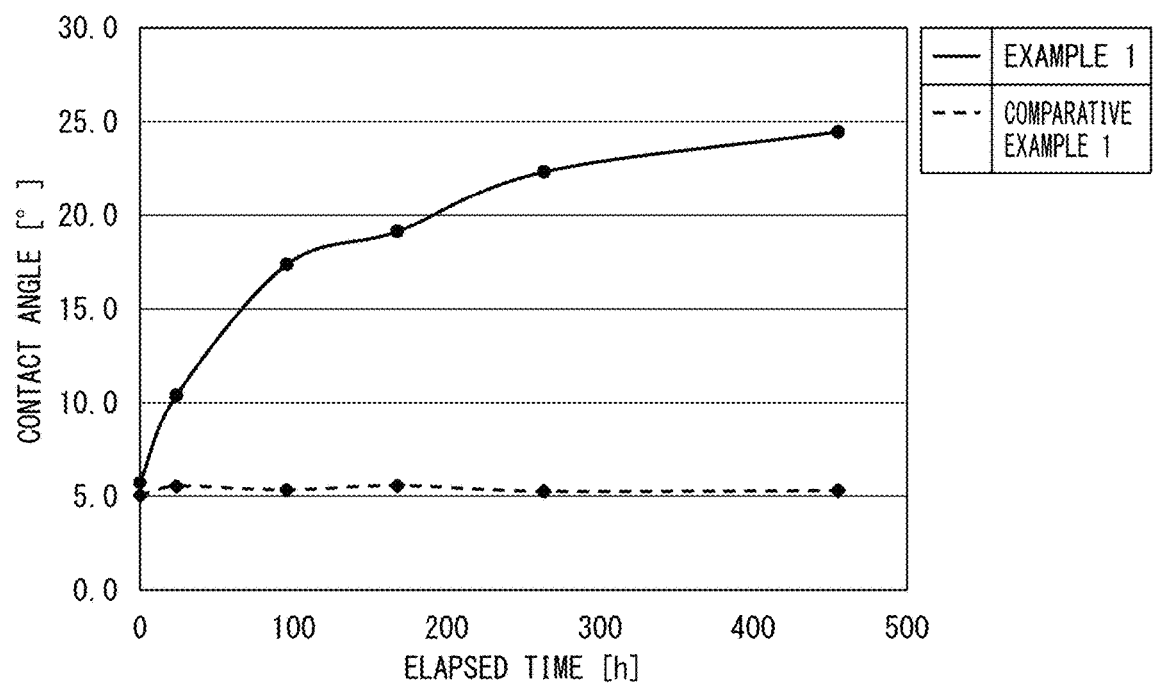
FIG. 5 is a diagram showing the time change of the wettability of the antireflection layer.

FIG. 5 is a diagram showing the time change of the wettability of the antireflection layer of Example 1 and Comparative Example 1. The horizontal axis is the elapsed time since the surface of the antireflection layer was plasma-treated with $O_2$, and the vertical axis is the contact angle of water calculated by the θ/2 method. Example 1 is an antireflection layer produced by the ion beam assisted vapor deposition method shown in FIG. 4A, and Comparative Example 1 is an antireflection layer produced by the vacuum vapor deposition method shown in FIG. 4B. In each of the antireflection layers, 9 layers of $SiO_2$ and $TiO_2$ are alternately laminated.

The wettability was evaluated by plasma-treating the surface of the antireflection layer with $O_2$, dropping water after a lapse of a predetermined time, and evaluating the contact angle of the dropped water. Plasma treatment with $O_2$ was performed to match the initial surface condition of the antireflection layer.

Both Example 1 and Comparative Example 1 had high wettability immediately after the $O_2$ plasma treatment. It is considered that the surface of the antireflection layer was activated by the $O_2$ plasma treatment and the hydrophilic groups were exposed. The antireflection layer of Comparative Example 1 did not change in wettability even after the lapse of time. On the other hand, the antireflection layer of Example 1 decreased in wettability and increased water repellency with the passage of time. The antireflection layer according to Example 1 had a water contact angle of 20 degrees or more after 300 hours had passed. It is considered that this is because the effect of the $O_2$ plasma treatment decreased as time passed from the $O_2$ plasma treatment, and the contact angle of water was affected by the state of the surface of the antireflection layer. The antireflection layer according to Example 1 is dense and has high smoothness because it is produced by an ion beam assisted vapor deposition method.

Since the antireflection layer according to Example 1 is more water repellent than the antireflection layer of Comparative Example 1, the polarizing plate of Example 1 is superior in moisture resistance to the polarizing plate of Comparative Example 1.

Figure 6:
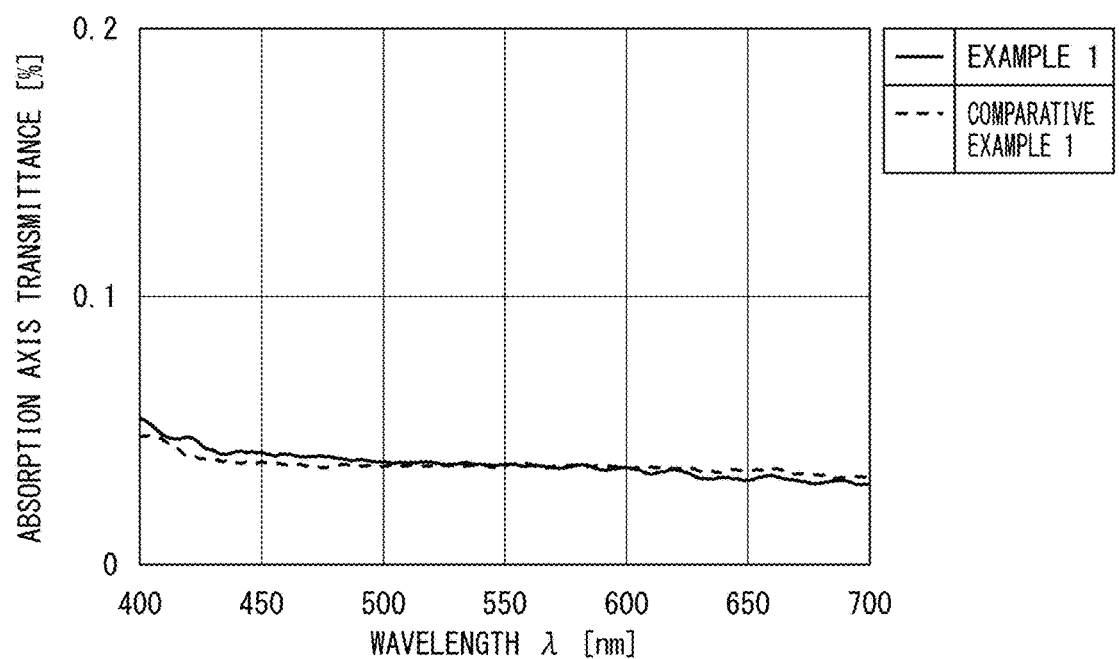
FIG. 6 is a diagram showing the absorption axis transmittance of the polarizing plate.
Figure 7:
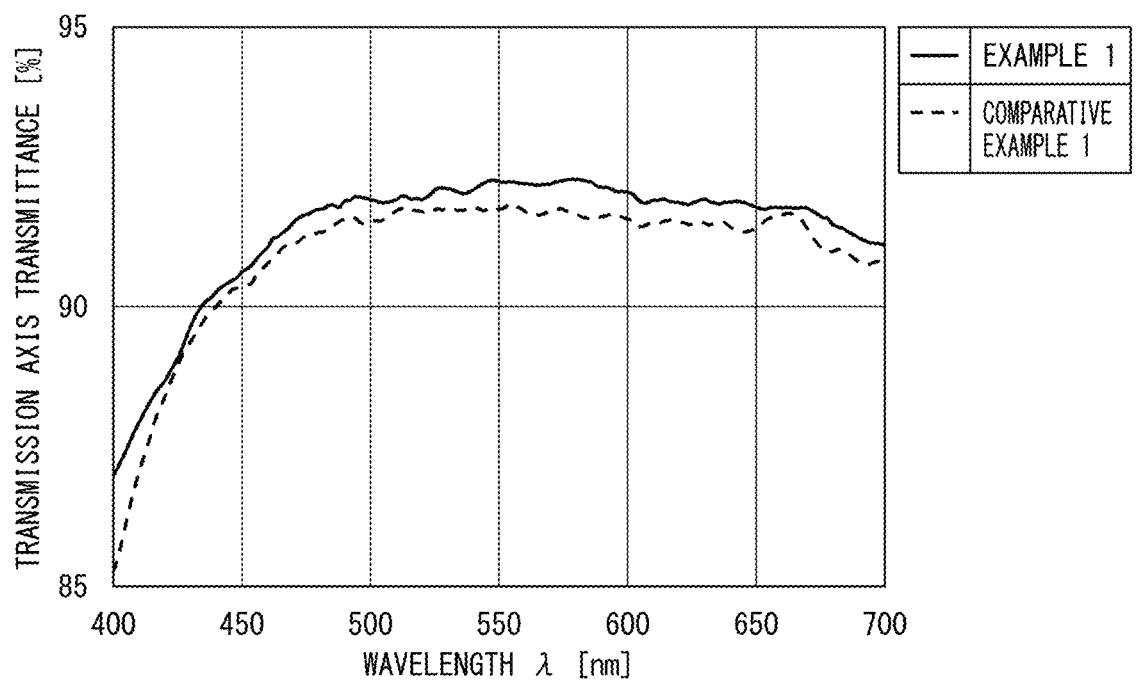
FIG. 7 is a diagram showing the transmission axis transmittance of the polarizing plate.

FIGS. 6 and 7 are diagrams showing the optical characteristics of the polarizing plate having the antireflection layer of Example 1 and Comparative Example 1, respectively. Each polarizing plate has a reflective layer made of Al having a height of 250 nm, a dielectric layer made of $SiO_2$ with a film thickness of 5 nm, and an absorption layer made of FeSi with a film thickness of 25 nm in order from the transparent substrate side as protrusions on a surface of the transparent substrate opposite to the surface having the antireflection layer. FIG. 6 shows the results of the absorption axis transmittance of the polarizing plate having the antireflection layer of Example 1 and Comparative Example 1, respectively. The horizontal axis of FIG. 6 is the wavelength, and the vertical axis is the absorption axis transmittance. FIG. 7 shows the results of the transmission axis transmittance of the polarizing plate having the antireflection layer of Example 1 and Comparative Example 1, respectively. The horizontal axis of FIG. 7 is the wavelength and the vertical axis is the transmission axis transmittance.

The polarizing plate having the antireflection layer of Example 1 and Comparative Example 1 is different only in the method of manufacturing the antireflection layer as described above, and the transparent substrate 10 and the protrusions 20 are the same. The same shape of the convex portion 20 can be confirmed from the fact that the absorption axis transmittances of the polarizing plates having the antireflection layers of Example 1 and Comparative Example 1 are substantially the same. The difference in the transmittance of the polarizing plate having the antireflection layer of Example 1 and Comparative Example 1 is due to the difference of the antireflection layer. As shown in FIG. 7, the polarizing plate having the antireflection layer of Example 1 is superior in optical characteristics to the polarizing plate having the antireflection layer of Comparative Example 1 in the entire visible light region.

Figure 8:
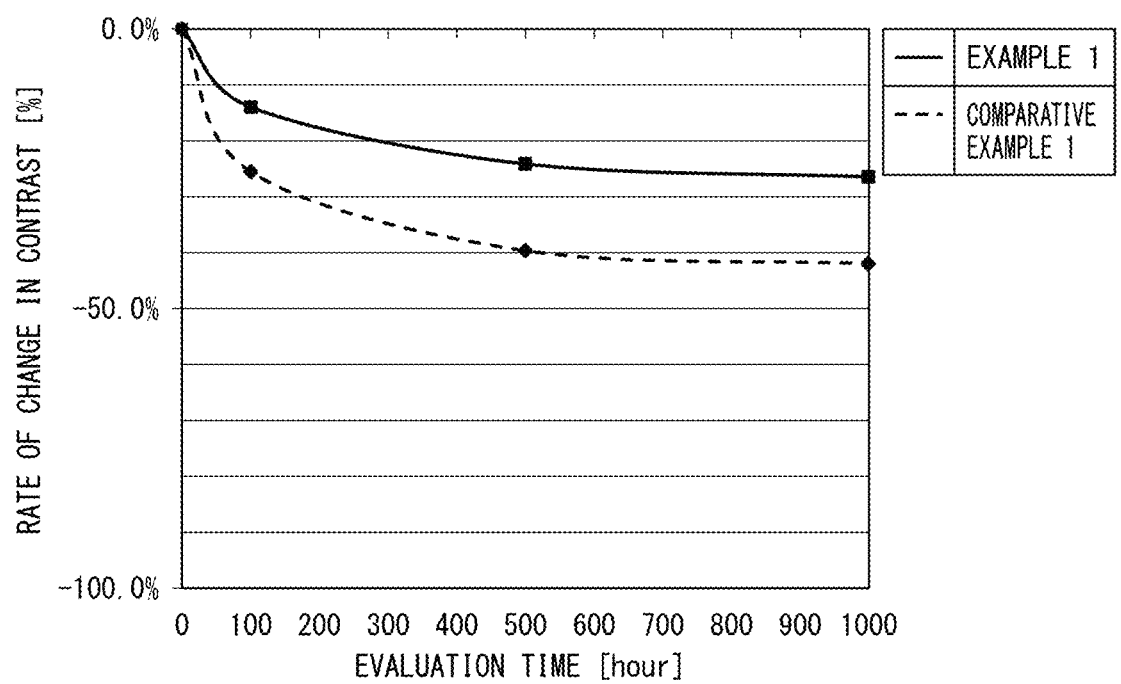
FIG. 8 shows the results of heat resistance tests of the polarizing plates.

Further, FIG. 8 shows the results of heat resistance tests of the polarizing plates having the antireflection layers of Example 1 and Comparative Example 1, respectively. The horizontal axis is the evaluation time, and the vertical axis is the rate of change in contrast. In the heat resistance test, the polarizing plate was left in a clean oven heated to 250° C., and the difference in contrast before and after the standing was evaluated. The contrast is calculated by dividing the transmission axis transmittance by the absorption axis transmittance. The evaluation was performed by taking the case where the incident light is in the green band of the visible light region (wavelength is 520 nm or more and 590 nm or less) as an example.

As shown in FIG. 8, the reduction rate of the contrast of the polarizing plate having the antireflection layer of Example 1 was smaller than the reduction rate of the contrast of Comparative Example 1. The polarizing plate having the antireflection layer of Example 1 had a contrast reduction rate of less than 40% after 1000 hours at a temperature of 250° C. It is considered that this is because the antireflection layer according to Example 1 was produced by the ion beam assisted vapor deposition method, so that it was dense and was not easily affected by heat. The effect of heat is excessive oxidation or the like due to the invasion of oxygen into the inside.

In FIG. 8, the case where the incident light is in the green band in the visible light region (wavelength is 520 nm or more and 590 nm or less) is taken as an example. When the incident light is in the red band of the visible light region (wavelength is 600 nm or more and 680 nm or less) and the incident light is in the blue band of the visible light region (wavelength is 430 nm or more and 510 nm or less), similar results were obtained although the rate of change in contrast is slightly different. That is, the polarizing plate having the antireflection layer of Example 1 is superior in heat resistance to the polarizing plate having the antireflection layer of Comparative Example 1.

Figure 9:
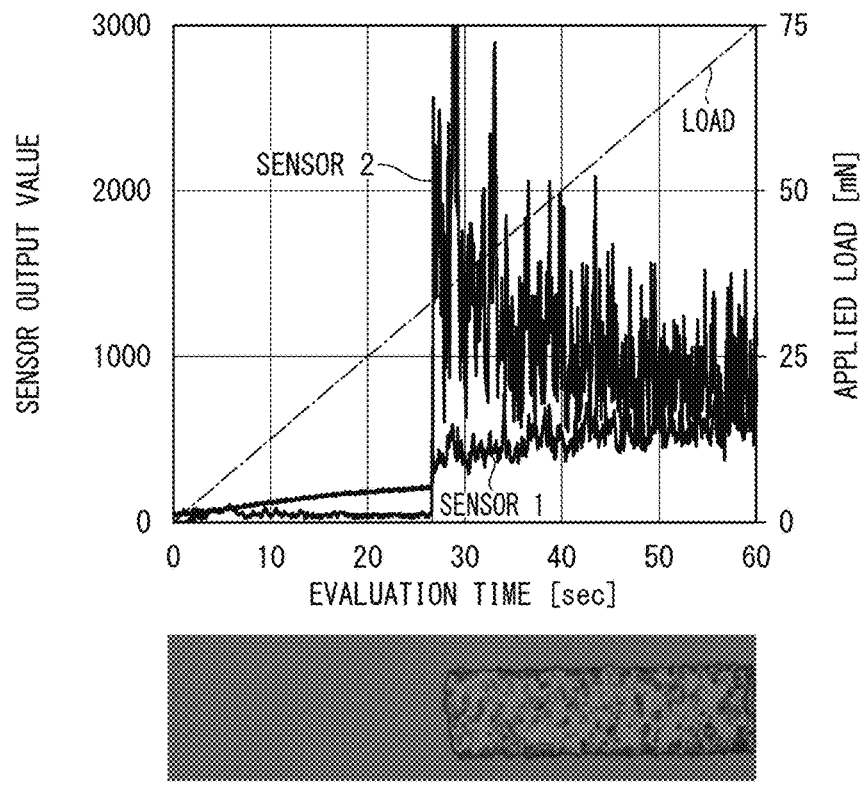
FIG. 9 shows the result of the scratch test of the polarizing plate of Comparative Example 1.
Figure 10:
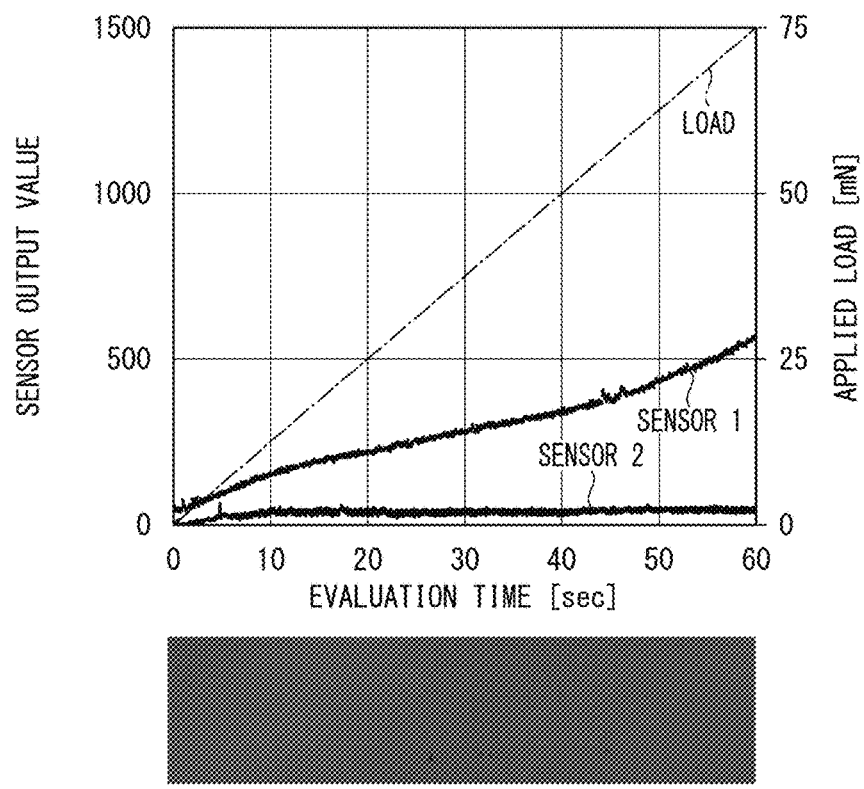
FIG. 10 shows the result of the scratch test of the polarizing plate of Example 1.

FIGS. 9 and 10 are diagrams showing the results of scratch tests on the polarizing plates of Example 1 and Comparative Example 1. FIG. 9 is the result of the scratch test of the polarizing plate of Comparative Example 1, and FIG. 10 is the result of the scratch test of the polarizing plate of Example 1. The lower part of FIGS. 9 and 10 shows the surface state of the antireflection layer after the evaluation. The scratch test was carried out with Reska CSR-2000 (manufactured by Reska Co., Ltd.).

The scratch test was measured by applying a stylus to the surface of the antireflection layer of the polarizing plate. The scratch test was conducted in accordance with JIS R-3255. The excitation amplitude of the stylus was 100 μm, the excitation frequency was 45 Hz, the scratch speed was 10 μm/sec, the initial load was 0 mN, the maximum load was 75 mN, the measurement time was 60 seconds, and the stylus diameter was 15 μm. The sensor 1 is obtained by integrating the delay of the movement of the stylus with respect to the excitation in the horizontal direction, and corresponds to the frictional force in the theoretical approximation formula. The sensor 2 indicates the vertical vibration acceleration of the stylus. The load indicates the load applied to the thin film.

As shown in FIG. 9, the antireflection layer according to Comparative Example 1 was peeled off when an applied load of 33 mN was applied. That is, the peeling load of the antireflection layer of Comparative Example 1 was 33 mN. On the other hand, as shown in FIG. 10, the antireflection layer according to Example 1 did not peel off even with an applied load of 75 mN. That is, the polarizing plate having the antireflection layer of Example 1 is superior in scratch resistance to the polarizing plate having the antireflection layer of Comparative Example 1.

[Optical Apparatus]

An optical apparatus according to a second embodiment includes the polarizing plate 100 according to the first embodiment Examples of the optical apparatus may include a liquid crystal projector, a head-up display, a digital camera, and so on. The polarizing plate 100 according to the first embodiment are excellent in reliability and can be used for various purposes. The polarizing plate 100 is made of an inorganic material. The polarizing plate 100 is particularly preferably used for liquid crystal projectors, head-up displays and the like, which require higher heat resistance than organic polarizing plates.

In a case where the optical apparatus includes a plurality of polarizing plates, at least one of the plurality of polarizing plates may be the polarizing plate 100 according to the first embodiment. For example, when the optical apparatus is a liquid crystal projector, polarizing plates are arranged on the incident side and the outgoing side of the liquid crystal panel. As one of the polarizing plates, the polarizing plate 100 according to the first embodiment are used.

Although the preferred embodiments of the present invention have been described in detail above, the present invention is not limited to the specific embodiments, and various modifications and changes are possible within the range in which the effects of the present invention are exhibited.

REFERENCE SIGNS LIST 10 transparent substrate
10A first surface
10B second surface
20 protrusions
22 reflecting layer
24 dielectric layer
26 absorbing layer
30 antireflection layer
31 low refractive index layer
32 high refractive index layer
100 polarizing plate

The invention claimed is:

1. A polarizing plate having a wire grid structure comprising:
a transparent substrate;
a plurality of protrusions protruding from a first surface of the transparent substrate; and
an antireflection layer laminated on a second surface opposite to the first surface of the transparent substrate;
wherein the plurality of protrusions are periodically arranged at a pitch shorter than a wavelength of light in a use band,
each of the protrusions extends in in a first direction and includes a reflective layer, a dielectric layer, and an absorption layer in order from the first direction,
the antireflection layer has 9 layers including high refractive index layers and low refractive index layers alternately laminated,
the antireflection layer is an ion beam assisted vapor deposition film or an ion beam sputtering film, and
wherein a surface of the antireflection layer has a water contact angle of 20 degrees or more after 300 hours following plasma-treating with $O_2$.

2. An optical apparatus comprising the polarizing plate according to claim 1.

3. A polarizing plate having a wire grid structure comprising:
a transparent substrate;
a plurality of protrusions protruding from a first surface of the transparent substrate; and
an antireflection layer laminated on a second surface opposite to the first surface of the transparent substrate;
wherein the plurality of protrusions are periodically arranged at a pitch shorter than a wavelength of light in a use band,
each of the protrusions extends in in a first direction and includes a reflective layer, a dielectric layer, and an absorption layer in order from the first direction,
the antireflection layer has 9 layers including high refractive index layers and low refractive index layers alternately laminated,
wherein the polarizing plate has a contrast reduction rate of less than 40% after 1000 hours at a temperature of 250° C., and
wherein a surface of the antireflection layer has a water contact angle of 20 degrees or more after 300 hours following plasma-treating with $O_2$.

4. An optical apparatus comprising the polarizing plate according to claim 3.

5. A polarizing plate having a wire grid structure comprising:
a transparent substrate;
a plurality of protrusions protruding from a first surface of the transparent substrate; and
an antireflection layer laminated on a second surface opposite to the first surface of the transparent substrate;
wherein the plurality of protrusions are periodically arranged at a pitch shorter than a wavelength of light in a use band,
each of the protrusions extends in a first direction and includes a reflective layer, a dielectric layer, and an absorption layer in order from the first direction,
the antireflection layer has 9 layers including high refractive index layers and low refractive index layers alternately laminated, and wherein the antireflection layer has a peeling load of 33 mN or more in a microscratch test with a scratch speed of 10 μm/sec according to JIS R3255, and wherein a surface of the antireflection layer has a water contact angle of 20 degrees or more after 300 hours following plasma-treating with $O_2$.

6. An optical apparatus comprising the polarizing plate according to claim 5.

* * * * *